May 24, 1932.  K. MACHT  1,859,880
APPARATUS FOR FORMING REENFORCED GLASS
Filed March 6, 1930
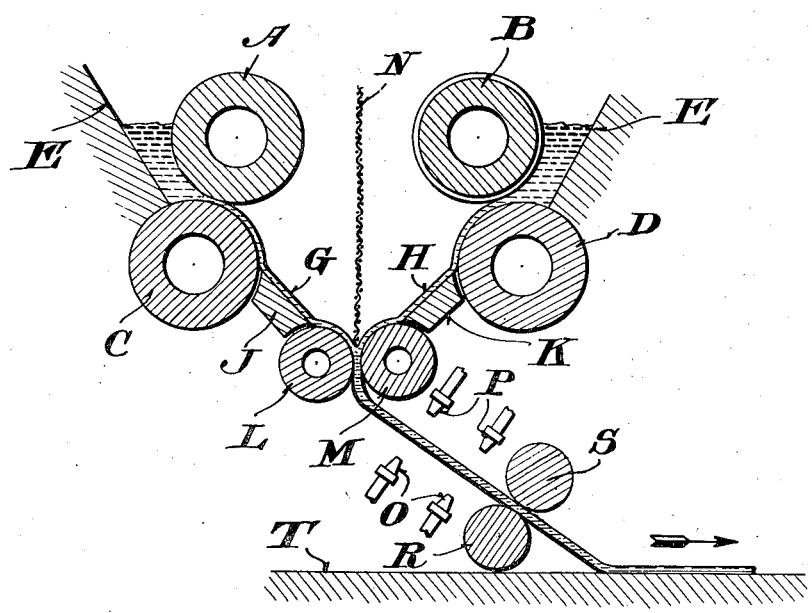
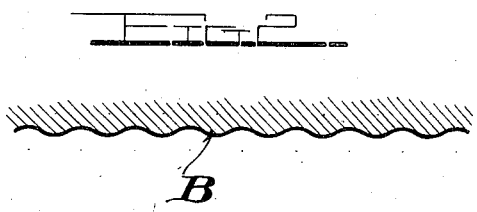
INVENTOR
Karl Macht,
BY
ATTORNEYS.

Patented May 24, 1932

1,859,880

UNITED STATES PATENT OFFICE

KARL MACHT, OF OBER-SALZBRUNN, GERMANY, ASSIGNOR TO SCHLESISCHE SPIEGEL-GLAS MANUFACTUR CARL TIELSCH, G. M. B. H., OF WALDENBURG-ALTWASSER, GERMANY

APPARATUS FOR FORMING REENFORCED GLASS

Application filed March 6, 1930. Serial No. 433,714.

This invention relates to an apparatus for forming reenforced glass by a so-called sandwich process, i. e., the process in which two sheets of glass are separately formed and brought together with a reenforcement in between the sheets. The reenforcement may be either a transparent sheet of material to form the so-called bullet-proof glass, or of wire.

In manufacturing of wire reenforced glass by the sandwich process trouble is encountered, in that air is entrapped in between the two sheets of glass when they are brought together, thus forming bubbles in the finished product.

I propose to overcome these difficulties by forming the inner surface of one of the sheets, or the inner surface of both of the sheets, depending on the kind of reenforcement which is to be inserted between the two sheets, with undulations or corrugations running lengthways of the sheet. I have found that where wire netting is used as reenforcement, it is only necessary to form one of the sheets with undulations or corrugations, whereas if a transparent sheet of solid material is inserted, it may be advantageous to form both of the sheets with undulations or corrugations so that the air on both sides of the reenforcement can escape through the channels formed by the undulations.

Referring to the accompanying drawings, in which corresponding parts are designated by corresponding marks of reference,—

Figure 1 is a vertical section through a wire glass forming machine embodying my invention.

Figure 2 shows a section of one of the upper forming rolls with the circumferential grooves.

In the drawings, two identical sheet-forming machines are shown as consisting of the upper forming rolls A and B and the lower forming rolls C and D, with a forming pass between each pair and receiving tables E adjacent the forming pass for receiving molten glass, either by the pot process, or directly from a furnace. The molten glass is fed between each pair of rolls to form the sheets G and H. The formed sheet slides down the blocks J and K to the compressing rolls L and M. Before the sheets G and H are brought into contact at the rolls L and M, the reenforcement N (shown here as wire) is inserted between two sheets. The upper roll B has circumferential corrugations or grooves therein, causing longitudinal corrugations in the upper surface of the sheet formed thereby. These rolls L and M compress the two sheets G and H with the reenforcement into one sheet. The grooves formed on the upper surface of one or both of the sheets G and H allow the air which has been fed with the reenforcement between the sheets to escape from between the sheets, when the sheets are compressed by the rolls L and M.

The composite sheet is re-heated by the burners O and P, and fed further to compressing rolls R and S, to be subsequently deposited on a take-off device T, shown here as a slab, although the take-off device might well be a roller bed.

From the above, it will be seen that the grooves on the upper surface of the sheets G and H permit the escape of air and allow the compressing rolls L and K to form a single sheet carrying reenforcement without air bubbles. I have found that it is not always necessary to re-heat the sheet by the burners P and Q and apply more compression by the rolls R and S. Whether or not these burners and compression rolls are to be used, depends on the condition of the sheets G and H at the time they encounter the compression rolls L and M.

The forming rolls are adjustable towards each other to vary the thickness of the formed sheets, and so are the compression rolls so as to vary the compression exerted by the rolls depending on the heat condition of the sheets. The several sets of forming rolls and the compression rolls, should be driven by different motors so that the speed of the several rolls can be varied to best suit a perfect welding of the several sheets of glass.

I have found that grooves which are formed when the ridges between the grooves are from three-eighths to one-half of an inch give a most satisfactory product to be subsequently compressed on another sheet. The depth of the grooves is about one-sixteenth of an inch.

Having thus described my invention what I claim as new and desire to secure by Letters Patent is:—

1. In an apparatus for forming a compound sheet of glass, the combination of a pair of compression rolls, two sheet-forming means, each comprising a pair of rolls, one of which is circumferentially channeled and the other of which is smooth, feeding a sheet to the compression rolls, and means for inserting a reenforcement between the two sheets, prior to the sheets being compressed by the compression rolls.

2. In an apparatus for forming a compound sheet of glass, the combination with a pair of compression rolls, a sheet-forming means comprising a pair of rolls, the upper of which is circumferentially channeled and the lower of which is smooth, feeding to the compression rolls, a second sheet-forming mechanism also feeding a sheet to the compression rolls, means for inserting a reenforcement between the two sheets prior to the reception of the sheets by the compression rolls, means for applying heat on both sides of the compound sheet, with means for applying additional pressure to both sides of the compressed sheet.

3. In an apparatus for forming a compound sheet of glass, the combination of a pair of compression rolls, a sheet forming means comprising a pair of rolls, the upper of which is circumferentially channeled and the lower of which is smooth, feeding one of the single sheets of glass to the compression rolls with that surface thereof formed by the smooth roll in contact with one of the compression rolls, a second sheet forming mechanism feeding the other single sheet to the compression rolls, and means for inserting a reenforcement between the two single sheets prior to their passage between the compression rolls.

In testimony whereof I hereunto affix my signature.

KARL MACHT.